(12) United States Patent
Rule

(10) Patent No.: US 6,569,479 B2
(45) Date of Patent: May 27, 2003

(54) PROCESS FOR REDUCTION OF ACETALDEHYDE AND OXYGEN IN BEVERAGES CONTAINED IN POLYESTER-BASED PACKAGING

(75) Inventor: Mark Rule, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 10/106,503

(22) Filed: Mar. 27, 2002

(65) Prior Publication Data

US 2002/0136808 A1 Sep. 26, 2002

Related U.S. Application Data

(63) Continuation of application No. 09/427,788, filed on Oct. 27, 1999, now abandoned.

(51) Int. Cl.[7] .......................... B65B 25/00; B65D 81/24
(52) U.S. Cl. ....................... 426/131; 426/106; 426/392; 426/397; 428/36.92
(58) Field of Search ................................ 426/106, 127, 426/131, 392, 397; 428/36.92

(56) References Cited

U.S. PATENT DOCUMENTS

| | | |
|---|---|---|
| 3,956,324 A | 5/1976 | Jost |
| 4,340,721 A | 7/1982 | Bonnebat et al. |
| 4,357,461 A | 11/1982 | Go et al. |
| 4,368,286 A | 1/1983 | Hayashi et al. |
| 4,403,090 A | 9/1983 | Smith |
| 4,552,791 A | 11/1985 | Hahn |
| 4,764,323 A | 8/1988 | Al Ghatta |
| 4,820,795 A | 4/1989 | Hirata et al. |
| 4,840,981 A | 6/1989 | Hasuo et al. |
| 4,886,847 A | 12/1989 | Bastioli et al. |
| 4,894,404 A | 1/1990 | Minnick |
| 5,017,680 A | 5/1991 | Sublett |
| 5,034,252 A | 7/1991 | Nilsson et al. |
| 5,084,356 A | 1/1992 | Deak et al. |
| 5,085,904 A | 2/1992 | Deak et al. |
| 5,102,943 A | 4/1992 | Logullo |
| 5,298,550 A | 3/1994 | Riccardi et al. |
| 5,340,884 A | 8/1994 | Mills |
| 5,364,666 A | 11/1994 | Williams et al. |
| 5,378,510 A | 1/1995 | Thomas et al. |
| 5,389,710 A | 2/1995 | Dege et al. |
| 5,405,921 A | 4/1995 | Muschiatti et al. |
| 5,462,779 A | 10/1995 | Misiano et al. |
| 5,468,520 A | 11/1995 | Williams et al. |
| 5,510,155 A | 4/1996 | Williams et al. |
| 5,531,060 A | 7/1996 | Fayet et al. |
| 5,552,512 A | 9/1996 | Sublett |
| 5,573,820 A | 11/1996 | Harazoe et al. |
| 5,587,191 A | 12/1996 | Donsbach et al. |
| 5,616,369 A | 4/1997 | Williams et al. |
| 5,670,224 A | 9/1997 | Izu et al. |
| 5,688,874 A | 11/1997 | Hoffman |
| 5,691,007 A | 11/1997 | Montgomery |
| 5,704,983 A | 1/1998 | Thomas et al. |
| 5,744,246 A | 4/1998 | Ching |
| 5,834,079 A | 11/1998 | Blinka et al. |
| 5,904,960 A | 5/1999 | Becraft et al. |
| 5,942,297 A | 8/1999 | Ve Speer et al. |
| 5,985,389 A | 11/1999 | Dalton et al. |
| 6,057,013 A | 5/2000 | Ching et al. |

FOREIGN PATENT DOCUMENTS

| | | |
|---|---|---|
| EP | 0 222 714 | 5/1987 |
| EP | 0 460 796 | 4/1991 |
| EP | 0 826 713 | 3/1998 |

*Primary Examiner*—Steve Weinstein
(74) *Attorney, Agent, or Firm*—Finnegan, Henderson, Farabow, Garrett & Dunner, LLP

(57) ABSTRACT

A process for reducing acetaldehyde concentration in beverages contained in polyester-based packaging, wherein oxygen permeation into the container is reduced or eliminated. The polyester contains an oxidation catalyst active for the oxidation of acetaldehyde to acetic acid. A composition comprising a polyester and said oxidation catalyst. A polyester-based container comprising said oxidation catalyst, and a bottled beverage having a polyester-based container comprising an oxidation catalyst active for the oxidation of acetaldehyde to acetic acid.

19 Claims, 1 Drawing Sheet

PROCESS FOR REDUCTION OF ACETALDEHYDE AND OXYGEN IN BEVERAGES CONTAINED IN POLYESTER-BASED PACKAGING

This is a continuation of application Ser. No. 09/427,788, filed Oct. 27, 1999, now abandoned, which is incorporated herein by reference.

FIELD OF INVENTION

The present invention relates to a method of reducing or eliminating the migration of acetaldehyde from polyester containers into beverages. This invention also relates to a method to reduce or eliminate the migration of oxygen into beverages contained in polyester containers.

BACKGROUND OF INVENTION

It is well known in the field of packaging that polyesters are versatile packaging materials. Polyethylene terephthalate (PET), in particular, is strong, tough, transparent, recyclable, and inexpensive. It is employed not only for its mechanical properties, but also because it possesses a good barrier to $CO_2$ migration.

In spite of these numerous advantages, there are packaging applications where polyesters such as PET are not adequate. These applications fall into two major categories: those where the oxygen sensitivity of the food or beverage is high, and the PET does not provide an adequate oxygen barrier; and those where off-taste from acetaldehyde is an issue, such as with water.

A number of foods and beverages are sensitive to oxygen. Some, such as beer, develop an off-taste when exposed to as little as 1 ppm of oxygen. Others, such as citrus products, lose their vitamin C potency due to reaction of ascorbic acid with oxygen. In the past, oxygen ingress into plastic containers has been addressed by the use of multi-layer containers containing barrier layers or scavenger layers. However, this approach is expensive, and compromises the transparency and recyclability of the plastic container.

Acetaldehyde is naturally formed during processing of any polyester containing ethylene glycol linkages. The compound is formed via a two-step reaction: the first step is cleavage of a polymer chain, generating a vinyl end group and a carboxylic acid end group. The second step is reaction of the vinyl end group with a hydroxyethyl end group, reforming the polymer chain and releasing acetaldehyde. Once formed, the acetaldehyde will migrate from the container sidewall into the beverage over time.

During the lifetime of a typical PET container, several hundred ppb of acetaldehyde can migrate from the container sidewall into the beverage. For sensitive products, such as water, these levels of acetaldehyde are significantly above the taste threshold. Approaches to address this problem have included the use of low molecular weight PET resin, to minimize the thermal history and hence acetaldehyde generation of the polymer, and the use of amine-based acetaldehyde scavengers. These approaches have been only partially effective. The use of low molecular weight resins compromise the mechanical strength and performance of the polyester. The use of acetaldehyde scavengers compromise the clarity and color of the polymer; in addition, the amount of acetaldehyde scavenger required is significant, and increase the cost of the polyester containers considerably.

Therefore, there is a need to identify improved methods to reduce or eliminate the migration of acetaldehyde from polyester containers into beverages. There is also a need to identify methods to reduce or eliminate the ingress of oxygen into polyester containers.

SUMMARY OF INVENTION

It is the object of the present invention to provide a method to reduce or eliminate acetaldehyde migration into polyester containers and simultaneously reduce or eliminate the migration of oxygen into polyester containers.

It is a further object of the present invention to provide a method to accomplish these objectives that is low cost, and provides containers that are fully recyclable and easy to manufacture.

The present invention is based on incorporation of low levels of active oxidation catalyst into a polyester-based container. We have discovered that when suitable oxidation catalysts are dispersed into polyesters, the oxidation of acetaldehyde to acetic acid occurs. Because acetic acid has a much higher taste threshold than acetaldehyde, the potential for off-taste from the polyester is eliminated. In addition, because the oxidation occurs by consumption of oxygen ingressing into the container sidewall, oxygen permeation is reduced or eliminated, as long as acetaldehyde is present in the container sidewall.

More particularly, the present invention encompasses a method of reducing the amount of acetaldehyde in a beverage in a polyester-based container, wherein the oxidation catalyst is active for the oxidation of acetaldehyde to acetic acid. The polyester-based container may be a polyethylene terephthalate (PET) container, and the oxidation catalyst is a variable valent metal, preferably a cobalt or manganese salt.

Still more particularly, the oxidation catalyst is a compound comprising a variable valent metal complexed with amine, phosphine or alcohol, and is added to the polyester during the injection or extrusion molding process.

The present invention also relates to a polyester based container comprising an oxidation catalyst located within the polyester, wherein the oxidation catalyst is active for the oxidation of acetaldehyde to acetic acid.

The present invention is also related to a bottled beverage comprising a polyester-based container, a beverage in the container and an oxidation catalyst located within the polyester, wherein the oxidation catalyst is active for the oxidation of acetaldehyde to acetic acid.

The present invention further relates to a composition comprising a polyester and an oxidation catalyst, wherein the oxidation catalyst is active for the oxidation of acetaldehyde to acetic acid. The polyester may be polyethylene terephthalate or polyethylene naphthalate.

Although cobalt and manganese salts are widely used in polyesters as toners and transesterification catalysts, they are always present in the final polyester in a deactivated state. This deactivation is intentional, and is accomplished by the addition of phosphates, which react with the metal salts to form inactive, particulate metal phosphates. Therefore, such polyester compositions described in the prior art are outside of the present invention.

Other inventions have described the use of oxidation catalysts to prevent oxygen ingress into polyester containers. However, these prior inventions rely on the use of the oxidation catalyst to oxidize a readily oxidizable polymer that has been incorporated into the polyester container. Such oxidizable polymers include blends of PET with polybutylene and PET with partially aromatic nylons. These two polymers are readily oxidized by air in the presence of cobalt salts. However, use of these polymers is detrimental because of cost, processing difficulties, and the formation of undesirable reaction by-products. Because of the potential for migration of unknown oxidation products into the beverage, the oxidizable polymer must be kept out of direct contact with the beverage. This necessitates the use of expensive multilayer containers, and compromises the capability of such containers to be recycled back into food-contact applications.

In contrast, the present invention depends only on the oxidation of acetaldehyde with acetic acid being the only reaction product. As a result, the catalyst can be dispersed throughout the container sidewall, and mono-layer construction as well as direct food contact is acceptable. In addition, because PET is resistant to oxidation under the conditions of use, there are no issues with regard to polymer degradation, migration of unknown oxidation products, etc.

Other objects features and advantages of this invention will become apparent to those skilled in the art upon understanding the foregoing detailed description and accompanying drawings.

DETAILED DESCRIPTION

Figure 1:
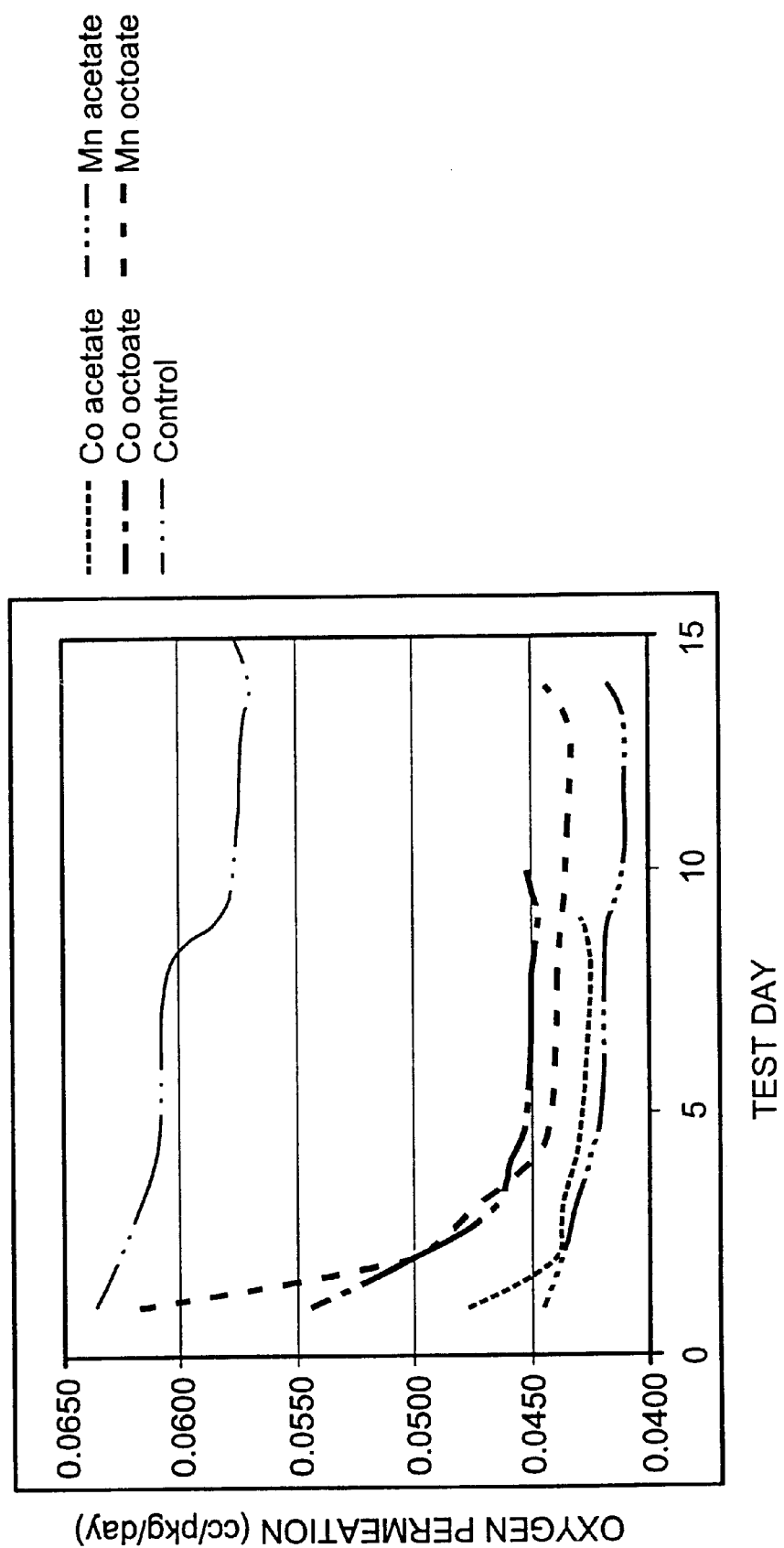
FIG. 1 is graph illustrating oxygen permeation rates for various PET containers.

As summarized above, the methods of the present invention provide a process of reducing or eliminating the migration of acetaldehyde from polyester-based containers into beverages, while reducing or eliminating the migration of oxygen into the container. By reducing the amount of acetaldehyde in the beverage, the potential for off-taste from the polyester is decreased.

Generally, the present invention encompasses a method of incorporating an oxidation catalyst into a polyester-based container, wherein the oxidation catalyst is active for the oxidation of acetaldehyde to acetic acid. The oxidation occurs by consumption of oxygen ingressing into the container sidewall, and thus, oxygen permeation into the polyester-based container is reduced or eliminated. The present invention also encompasses a polyester based container comprising an oxidation catalyst located within the polyester wherein the oxidation catalyst is active for the oxidation of acetaldehyde to acetic acid. In addition, the present invention relates to a bottled beverage comprising the polyester-based container described hereinbefore and a beverage in the container. The present invention further relates to a composition comprising a polyester and an oxidation catalyst, wherein the oxidation catalyst is active for the oxidation of acetaldehyde to acetic acid.

Although all oxidation catalysts active for the oxidation of acetaldehyde to acetic acid are contemplated in this invention, particularly useful catalysts include compounds comprising a variable valent metal such as cobalt or manganese salts. These catalysts can be present as simple salts, or as complexes with amines, phosphines, or alcohols. Preferred complexes include amines such as ethylenediaminetetraacetic acid (EDTA), glycine, and the like. Simple salts can include cobalt acetate, cobalt octoate, cobalt naphilhenate, manganese acetate, manganese octoate, and manganese naphthenate. Other catalysts that may be effective include, but are not limited to nickel, vanadium, chromium, platinum, palladium, rhodium, silver, and copper.

The amount of oxidation catalyst added to the polyester is dependent upon the type of polyester used, the type of oxidation catalyst used, and the type of article being produced. Generally, the oxidation catalyst is present in the amount of approximately 1–500 ppm. Preferably, the polyester is present in the amount of approximately 5–50 ppm. Lesser amounts of oxidation catalyst result in reduced rates of oxygen and acetaldehyde consumption, and higher amounts lead to increased numbers of undesirable side reactions. The amount of oxidation catalyst can be selected to achieve any desired result; however, in practice quantities of less than 50 ppm have proven effective.

Because the oxidation occurs by consumption of oxygen ingressing into the container sidewall, oxygen permeation is reduced or eliminated, as long as acetaldehyde is present in the container sidewall. Furthermore, because the permeation rate of oxygen is relatively low in PET (typically 3 ppm/month), and the acetaldehyde content is significant (typically >7 ppm), the consumption of acetaldehyde will afford oxygen ingress prevention for several months. Where increased shelf-life is required, it is straightforward to increase the acetaldehyde concentration by increasing the thermal history of the polyester during processing.

The oxidation catalyst may be added to polyesters including but not limited to poly(ethylene terephthalate) ("PET"), poly(ethylene naphthalate) ("PEN"), PET/PEN blends, PET copolymers, and the like. The most preferred polyesters are PET and derivatives thereof. PET is a high molecular weight condensation polymer. PET is currently produced in large volumes for three major markets: fiber, bottle resin, and film. Although PET is effectively the same polymer for all three markets, some of its properties can be modified by additives and changes in molecular weight, and all producers of PET tailor their product, to the extent practical, to optimize downstream processing and final performance properties for the specific application.

The method of eliminating acetaldehyde as disclosed in the present invention is applicable to any type of polyester-based container used to transport or store beverages. Suitable containers include, but are not limited to, bottles, drums, carafes, coolers, etc.

The oxidation catalysts can be added to the polyester in any manner that results in an active catalyst, it is particularly preferred to add the catalyst during the injection or extrusion molding process. This allows the maximum flexibility in incorporation of the catalyst, and reduces the potential for the deactivation of the catalyst by reaction with other components of the polyester, especially phosphates.

The oxidation catalyst is activated by exposure to UV radiation, by exposure to peroxides, and by exposure to ozone. Exposure to peroxides occur naturally in the course of processing PET due to the presence of small amounts of peroxy oxidation products, formed by the interaction of oxygen with diethylene glycol units in the polymer. Once active, the reaction process continually reactivates the catalyst.

The present invention is useful in preventing the migration of acetaldehyde from polyester containers into any type of beverage in order to prevent off-taste of the beverage from occurring. Depending upon the type of beverage being used, the taste threshold of acetaldehyde may vary. However, it is preferred that the concentration of acetaldehyde in the beverage be decreased to approximately less than 40 ppb. More preferably, the concentration of acetaldehyde in the beverage is decreased to less than 20 ppb.

Acetic acid has a much higher taste threshold than acetaldehyde, and is only detectable by taste at a concentration level approximately 1,000 times higher than the detectable concentration of acetaldehyde. Thus, acetic acid may be present in the beverage in the amount of approximately 40 ppm or less. Preferably, the concentration of acetic acid in the beverage is less than 20 ppm.

As indicated above, the present invention may be used to improve the taste of any type of beverage including, but not limited to water, colas, sodas, alcoholic beverages, juices, etc. However, it is particularly useful for preventing the off-taste of sensitive products such as water.

In another embodiment of the present invention, a bottled beverage is provided in a polyester-based container, wherein the polyester-based container comprises an oxidation catalyst active for the oxidation of acetaldehyde to acetic acid.

The present invention is also directed to a composition comprising a polyester and an oxidation catalyst, wherein the oxidation catalyst is active for the oxidation of acetaldehyde to acetic acid.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or scope of the appended claims.

EXAMPLES

Example 1

100 grams of cobalt octoate (12 wt % cobalt) was mixed with 100 grams of synthetic mineral oil. 20 grams of this mixture was coated onto 24 kg of dry PET pellets. The coated pellets where then fed to an Arburg unit cavity injection molding machine, running at 520° F. 27 gram preforms were made with a 30 second cycle time. The preforms were blown into 20 oz containers, using a Sidel SBO-2 blower molder. The resulting bottles had 50 ppm cobalt (as Cobalt octoate).

Examples 2–6 are directed to the absorption of oxygen into PET containers comprising oxidation catalysts. The PET container of Example 2 was the control and contained no oxidation catalyst. Example 3 comprised 50 ppm of cobalt as cobalt acetate. Example 4 comprised 50 ppm of cobalt as cobalt octoate. The container of Example 5 comprised 50 ppm of manganese as manganese octoate, and Example 6 contained 50 ppm of manganese as manganese acetate.

In each example, the permeation rate of oxygen was determined by utilizing a Mocon OX-TRAN permeation measurement instrument. To measure oxygen ingress, each PET container was mounted on the OX-TRAN. The outer surface of the container was exposed to air at ambient temperature and humidity, while the inside of the container was continually swept with oxygen-free nitrogen at a rate of 10 to 20 cc/min. The sweep gas was then passed through a coulometric sensor, which electrochemically measured the amount of oxygen present in the sweep gas. From the detector response, the oxygen ingress rate was calculated.

The results of the analysis performed in Examples 2–6 are illustrated in the graph of FIG. 1.

As the data in FIG. 1 indicates, the permeation of oxygen into bottles containing an oxidation catalyst was significantly lower than oxygen permeation into a bottle containing no oxidation catalyst.

Examples 7–9 are directed to acetaldehyde migration from PET containers into water.

Example 7

The acetaldehyde concentration in preforms comprising varying amounts of oxidation catalysts was determined. Specifically, preforms comprising 10 ppm, 25 ppm, and 50 ppm of cobalt octoate and preforms comprising 10 ppm, 25 ppm, and 50 ppm of cobalt napthenate were tested. A preform comprising no oxidation catalyst was also tested as a control. To determine the acetaldehyde content in each preform, a portion of the preform was removed and chilled in liquid nitrogen. The preform sample was then ground to pass through a 2 mm screen. 0.100 grams of the granules were weighed into a 20 ml widemouth vial, and the vial was sealed with a teflon-lined crimp seal. The sample was then heated to 150° C. for 45 minutes to volatize the acetaldehyde contained in the polymer granules. The amount of volatized acetaldehyde was quantitatively measured by injecting a known amount of the vial headspace into a gas chromatograph equipped with a flame-ionization detector. The detector response was calibrated against known concentrations of acetaldehyde.

Example 8

The following procedure was used to determine the acetaldehyde concentration in the headspace of PET containers. The bottles tested comprised various concentrations of oxidation catalysts. Specifically, bottles comprising 10 ppm, 25 ppm and 50 ppm of cobalt octoate and bottles comprising 10 ppm, 25 ppm and 50 ppm of cobalt naphthenate were tested. A control bottle comprising no oxidation catalyst was also tested. PET preforms were blow-molded using standard processing conditions. After each container had cooled to room temperature, the contents of the bottle was flushed with a stream of air, and the bottle was tightly capped with a standard lined closure. The bottle was then stored at 22° C. for 24 hours. The amount of acetaldehyde that migrated from the sidewall to the interior of the bottle was then measured by taking a fixed amount of the air inside of the bottle, and performing standard GC analysis.

Example 9

In this example, the amount of acetaldehyde in water contained in PET bottles was measured. Various bottles comprising 10 ppm, 25 ppm and 50 ppm of cobalt octoate, and 10 ppm 25 ppm and 50 ppm or cobalt napthenate were analyzed. Bottles comprising no oxidation catalyst were also tested as controls. The acetaldehyde concentration was determined by filling each bottle with carbonated water and capping it with a standard lined closure. The container was then stored at 22° C. Periodically, typically every 1–4 weeks, a bottle comprising each of the varying amounts of oxidation catalyst was tested. No bottle was tested more than once. The bottle tested was chilled to 4° C., opened, and approximately 5 ml of carbonated water was removed via a pipette. The pipetted sample was then placed in a 20 ml vial containing approximately 1 gram of sodium chloride, and the amount of water added determined by weighing. The vial was then sealed, and heated to 75° C. for 30 minutes. A fixed amount of air in the headspace above the water was removed and analyzed by gas chromatography.

The results of the analysis performed in examples 7–9 are set forth in the table of FIG. 2.

FIG. 2
Concentration of Acetaldehyde
in PET Containers

| Additive | Preform (ppm) | Headspace (ppm) | Beverage (ppb) | | | | |
| --- | --- | --- | --- | --- | --- | --- | --- |
| | | | 40 days | 115 days | 159 days | 196 days | 211 days |
| Control | 5.71 | 3.19 | 39.6 | 112.0 | 117.0 | 137.0 | 162.7 |
| 10 ppm Co Octoate | 10.91 | 5.98 | 40.2 | 87.6 | 98.0 | 118.0 | 132.0 |
| 25 ppm Co Octoate | 12.67 | 6.96 | 23.5 | 66.6 | 74.0 | 91.0 | 110.1 |
| 50 ppm Co Octoate | 24.05 | 9.33 | 28.7 | 32.1 | 79.0 | 119.0 | 141.1 |
| 10 ppm Co | 6.46 | 3.78 | 53.5 | 132.5 | — | — | — |

-continued

FIG. 2
Concentration of Acetaldehyde
in PET Containers

| Additive | Preform (ppm) | Headspace (ppm) | Beverage (ppb) | | | | |
|---|---|---|---|---|---|---|---|
| | | | 40 days | 115 days | 159 days | 196 days | 211 days |
| Naphthenate 25 ppm Co Naphthenate | 7.56 | 3.70 | 25.0 | 51.5 | 79.0 | 107.0 | 126.5 |
| 50 ppm Co Naphthenate | 11.38 | 5.28 | 81.1 | 98.5 | — | — | — |

According to FIG. 2, the presence of oxidation catalysts in PET containers at concentrations of 25 ppm or more, significantly inhibited the migration of acetaldehyde into the water. Cobalt octoate was most effective in preventing acetaldehyde migration at a concentration of 25 ppm with a 36% decrease in acetaldehyde concentration. Cobalt naphthenate was also most effective at 25 ppm, with a 32% decrease in acetaldehyde concentration.

It should be understood that the foregoing relates to particular embodiment of the present invention, and that numerous changes may be made therein without departing from the scope of the invention as defined by the following claims.

I claim:

1. A method of reducing the amount of acetaldehyde in a beverage in a polyester-based container processed from polyester-based materials containing ethylene glycol linkages, said container not including added oxidizable polymers so that only the acetaldehyde, naturally formed during the processing of said polyester-based materials containing ethylene glycol linkages to form said container, undergoes oxidation in the side-walls of the container to form acetic acid, comprising the steps of:

incorporating an oxidation catalyst into the polyester-based materials during the formation of the container, in sufficient quantities such that the oxidation catalyst is active for the oxidation of acetaldehyde to acetic acid during filling and storage of the beverage in the container;

filling the container with the beverage in the presence of the active oxidation catalyst; and storing the beverage in the container in the presence of the active oxygen catalyst to thereby cause oxygen that permeates into the polyester container to react with the formed acetaldehyde in the container to convert said acetaldehyde to acetic acid, thus preventing off taste and reducing the amount of oxygen permeation into the container, thus increasing beverage shelf-life;

said container being permeable to oxygen and acetaldehyde in the absence of said active oxygen catalyst, wherein said container is a mono-layer construction with the catalyst dispersed throughout sidewalls of the container, the sidewalls being in direct contact with the beverage.

2. The method of claim 1, wherein the polyester-based container is a polyethylene terephthalate container.

3. The method of claim 1, wherein the oxidation catalyst is a cobalt or a manganese salt.

4. The method of claim 1, wherein the oxidation catalyst is a compound comprising an amine, a phosphine or an alcohol complexed with a variable valent metal.

5. The method of claim 1, wherein the oxidation catalyst is added to the polyester during injection or extrusion molding of the container.

6. The method of claim 1, wherein the oxidation catalyst is present in the polyester in the amount of 1–500 ppm.

7. The method of claim 6, wherein the oxidation catalyst is present in the polyester in the amount of 5–50 ppm.

8. A bottled beverage comprising:

a polyester-based container processed from polyester-based materials containing ethylene glycol linkages, said container not including added oxidizable polymers so that only the acetaldehyde, naturally formed during the processing of said polyester-based materials containing ethylene glycol linkages to form said container, undergoes oxidation in the side-walls of the container to form acetic acid, a beverage in the polyester-based container; and an oxidation catalyst incorporated within the polyester-based materials during the formation of the container, wherein the oxidation catalyst is incorporated in sufficient quantities such that the oxidation catalyst is active for the oxidation of acetaldehyde to acetic acid during both the filling and storage of the beverage in the container to thereby cause oxygen that permeates into the polyester container to react with the formed acetaldehyde in the container to convert said acetaldehyde to acetic acid thus preventing off taste, and reducing the amount of oxygen permeation into the container, thus increasing beverage shelf-life;

said container being permeable to oxygen and acetaldehyde in the absence of said active oxygen catalyst, wherein said container is a mono-layer construction with the catalyst dispersed throughout sidewalls of the container, the sidewalls being in direct contact with the beverage.

9. The bottled beverage of claim 8, wherein the polyester-based container is a polyethylene terephthalate container.

10. The bottled beverage of claim 8, wherein the oxidation catalyst is a cobalt or a manganese salt.

11. The bottled beverage of claim 8, wherein the oxidation catalyst is a compound comprising an amine, a phosphine or an alcohol.

12. The bottled beverage of claim 8, wherein the oxidation catalyst is added to the polyester during injection or extrusion molding of the container.

13. The bottled beverage of claim 8, wherein the oxidation catalyst is present in the polyester in an amount of 1–500 ppm.

14. The bottled beverage of claim 13, wherein the oxidation catalyst is present in the polyester in an amount of 5–50 ppm.

15. The bottled beverage of claim 8, wherein the beverage is water.

16. The bottled beverage of claim 8, wherein the concentration of acetaldehyde in the beverage is less than 40 ppb.

17. The bottled beverage of claim 16, wherein the concentration of acetaldehyde in the beverage is less than 25 ppb.

18. The bottled beverage of claim 8, wherein the concentration of acetic acid in the beverage is less than 40 ppm.

19. The bottled beverage of claim 18, wherein the concentration of acetic acid in the beverage is less than 25 ppm.

* * * * *